(12) United States Patent
Yeh et al.

(10) Patent No.: US 7,650,349 B2
(45) Date of Patent: Jan. 19, 2010

(54) PRESCRIBED NAVIGATION USING TOPOLOGY METADATA AND NAVIGATION PATH

(75) Inventors: Erh-Chun Yeh, Bellevue, WA (US);
Youxuan Jin, Bellevue, WA (US);
Zhenyu Tang, Sammamish, WA (US);
Jin Teik Teh, Redmond, WA (US);
Manoj Nuthakki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 11/029,953

(22) Filed: Jan. 5, 2005

(65) Prior Publication Data
US 2006/0149782 A1 Jul. 6, 2006

(51) Int. Cl.
*G06F 17/30* (2006.01)

(52) U.S. Cl. ........................... 707/101; 715/200

(58) Field of Classification Search ........................ None
See application file for complete search history.

(56) References Cited

U.S. PATENT DOCUMENTS

| | | | | |
|---|---|---|---|---|
| 5,835,905 A * | 11/1998 | Pirolli et al. | .................... | 707/3 |
| 5,878,431 A * | 3/1999 | Potterveld et al. | ........ | 707/103 R |
| 6,131,098 A * | 10/2000 | Zellweger | .................... | 707/102 |
| 6,393,386 B1 * | 5/2002 | Zager et al. | .................... | 703/25 |
| 6,633,878 B1 * | 10/2003 | Underwood | ................. | 707/100 |
| 6,718,535 B1 * | 4/2004 | Underwood | ................. | 717/101 |
| 7,099,885 B2 * | 8/2006 | Hellman et al. | ......... | 707/103 R |
| 2001/0016788 A1 * | 8/2001 | Hauwiller et al. | ........... | 700/283 |
| 2002/0022952 A1 * | 2/2002 | Zager et al. | .................... | 703/22 |
| 2002/0198994 A1 * | 12/2002 | Patton et al. | ................. | 709/225 |
| 2003/0009552 A1 * | 1/2003 | Benfield et al. | ............. | 709/224 |
| 2003/0131097 A1 | 7/2003 | Kasriel et al. | | |
| 2003/0182625 A1 * | 9/2003 | Davidov et al. | ............. | 715/513 |
| 2003/0225778 A1 * | 12/2003 | Fisher et al. | ................. | 707/102 |
| 2004/0220651 A1 * | 11/2004 | Kuzma et al. | ................ | 607/137 |
| 2004/0226051 A1 * | 11/2004 | Carney et al. | ................ | 725/135 |
| 2005/0050068 A1 * | 3/2005 | Vaschillo et al. | ............ | 707/100 |
| 2005/0120032 A1 * | 6/2005 | Liebich et al. | ............... | 707/100 |
| 2005/0187946 A1 * | 8/2005 | Zhang et al. | ................. | 707/100 |
| 2005/0210081 A1 * | 9/2005 | Fleck et al. | .................. | 707/204 |

FOREIGN PATENT DOCUMENTS

GB 2376094 A 12/2002

OTHER PUBLICATIONS

Wilfried Lemahieu, Context-Based Navigation in the Web by Means of Dynamically Generated Guided Tours, Computer Networks, vol. 39, No. 3, Jun. 21, 2002, pp. 1-22.

(Continued)

*Primary Examiner*—Don Wong
*Assistant Examiner*—Shyue Jiunn Hwa
(74) *Attorney, Agent, or Firm*—Workman Nydegger

(57) ABSTRACT

The subject invention provides a system and/or method that facilitates prescribing a navigation within an application utilizing a topology and a navigation path. The topology is created based upon received metadata and is a network of node objects and link objects. The navigation path is a sequential list over the topology that represents a sub-graph thereof. A prescribing component can create the topology and navigation path such that a prescribed navigation can be utilized by an application during navigation (e.g., exploration) during runtime.

14 Claims, 16 Drawing Sheets

OTHER PUBLICATIONS

Daniel Schwabe, et al., Navigation Modelling in Hypermedia Applications, 1994, 21 pages.

Daniel Schwabe, et al., Developing Hypermedia Applications Using OOHDM, 1998, pp. 1-20.

Daniel Schwabe, et al., Systematic Hypermedia Application Design with OOHDM, 1996 ACM, pp. 116-128, Washington, DC.

Mark D. Jacyntho, et al., A Software Architecture for Structuring Complex Web Applications, 2002, pp. 1-12.

IBM Web Services Navigator. Online Article Dec. 2, 2004, XP002460498. http://www.alphaworks.ibm.com/tech/wsnavigator>. Last accessed Nov. 29, 2007.

The eG Approach to Root-Cause Analysis. Online White Paper 2003. XP002460499. http://www.eginnovations.com/whitepaper/rca-whitepaper.pdf>. Last accessed Nov. 29, 2007.

Patricia Joseph. Understand WebSphere Extended Deployment. Online article XP002460500, Dec. 7, 2004. http://www.ibm.com/developerworks/library/ac-webxd/>. Last accessed Nov. 29, 2007.

European Search Report for European Patent Application No. EP05112238 dated Nov. 29, 2007, 3 pages.

OA dated Oct. 10, 2008 for Chinese Application No. 200510128886.9, 9 pages.

OA dated Mar. 17, 2008 for European Application No. 05112238.0-2211, 4 pages.

* cited by examiner

PRESCRIBED NAVIGATION USING TOPOLOGY METADATA AND NAVIGATION PATH

TECHNICAL FIELD

The subject invention generally relates to computer programming, and more particularly to systems and methods that facilitate developing an application.

BACKGROUND OF THE INVENTION

There is a growing trend to provide business application software to a plurality of industries in order to simplify business procedures and/or forecasts. Business application software provides navigation and/or exploration across heterogeneous business data, which can be related explicitly and/or implicitly. Business applications typically are assorted with an overwhelming amount of information, wherein an essentially endless amount of this information contains inter-relationships. For example, a typical middle market application can contain forms, tables, inventory, charts, graphs, etc., wherein a majority of data is intertwined explicitly and implicitly. Specifically, data (e.g., billing forms, employee tables, order forms, etc.) can be utilized in conjunction with business applications involving, for example, payroll applications, sales analysis, shipping applications, bonus reports, cost analysis, etc.

Conventionally, hypermedia systems are utilized to discover and/or navigate through the enormous quantities of information within a business application. Such hypermedia systems are information systems in which data access and exploration is accomplished through navigation rather than traditional con text querying. Additionally, such systems create and maintain links within an application or to external applications and resources. These links provide users with the ability to retrieve additional information related to the query results. For instance, a query for a list of customer names can also provide a link to another query that retrieves a list of orders for a particular customer.

One benefit associated with hypermedia systems is the ability to store complex, cross referenced bodies of information as a network of nodes and links (e.g., a hierarchical database model that links records together in a tree structure). Querying within navigation can be defined as a query for data access and a query for correlation. For instance, a query for data access can be utilized to provide data access to certain type of node where resources are data. Whereas a query for correlation provides the correlation of the data based upon, for example, metadata and/or keywords. In other words, the term "query" refers to getting data (e.g., projects data), whereas the term "navigation" refers to getting related data (e.g., projects relationships and data). This navigational projection of relationships between data can also be referred to as a "non-linear" exploration of data.

During non-linear exploration of data within a hypermedia system, a user typically can become lost and/or disorientated by the extensive cognitive overhead. Essentially, users can be overwhelmed by the vast amount of related links discovered during a navigational data exploration search. Moreover, navigation within hypermedia systems has traditionally been performed during runtime. A majority of the code is imperative, yielding modules with a single use, which in turn results in a very inefficient and slow application during runtime. In view of at least the foregoing, there is a need to improve navigation within related data in business applications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate developing an application by utilizing a prescribed navigation. The prescribed navigation utilizes a topology that is based upon received metadata, wherein a navigation path is employed to represent a sub-graph of the topology. A prescribing component can receive data during design time, wherein such data can be metadata (e.g., metadata related to a business framework). During the design of an application, the prescribing component can create a topology with an associated navigation path based upon the received data. The topology and the navigation path (e.g., NPath) can provide the employment of a prescribed navigation in design time that streamlines the development of an application. Furthermore, the prescribing component can provide navigation such as linear, star, and/or tree.

In accordance with one aspect of the subject invention, the prescribing component utilizes a navigation path provider infrastructure including at least one navigation path provider that can provide services to an application and/or navigation path client. In other words, the navigation path provider infrastructure manages communication between client applications and various navigation path providers. Moreover, the navigation path provider(s) can be a variety of resource providers that access a context node either through transformation and/or information retrieval mechanism.

In accordance with still another aspect of the subject invention, the creation of the topology can be automatic, manual, or a combination thereof. The prescribing component receives data (e.g., entity graph, business intelligence metadata, business intelligence journal, . . . ) that is utilized automatically in topology creation. Moreover, the topology can be created manual by utilizing a user interface tool that adds a link to represent a logical association between two entities. Additionally, the topology can also be created using a combination of automatic and manual techniques.

In accordance with yet another aspect of the subject invention, a navigation path expression can be created based upon the topology, wherein the navigation path expression is an object model. Elements and filters can be added to the navigation path expression, wherein such filters provide exclusion or inclusion for various sub-trees. Furthermore, navigation path expressions can be added to an element to programmatically prune the navigation path. In addition, code can be generated such that the navigation path is persisted as a set of metadata describing navigation route(s). The set of metadata can be utilized to generate code, wherein the navigation path expression can be composed in a strong typed manner.

In accordance with yet another aspect of the subject invention, the prescribing component interacts with a navigation path client application programmable interface (API) that can provide communications between computer software. The navigation path API can utilize user interface (UI) binding that enables a binding between an NPath element, or called Node, and user interface components, managed by metadata. Moreover, navigation path client API can utilize a journal that records a history of navigation for an application. The journal records the history of navigation regardless of the navigation path utilized. Thus, a complex history of navigation within a topology can provide various details and insight into navigation (e.g., discovery) of data within an application. The journal can be utilized as bases for a topology in order to provide a prescribed navigation for an application.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
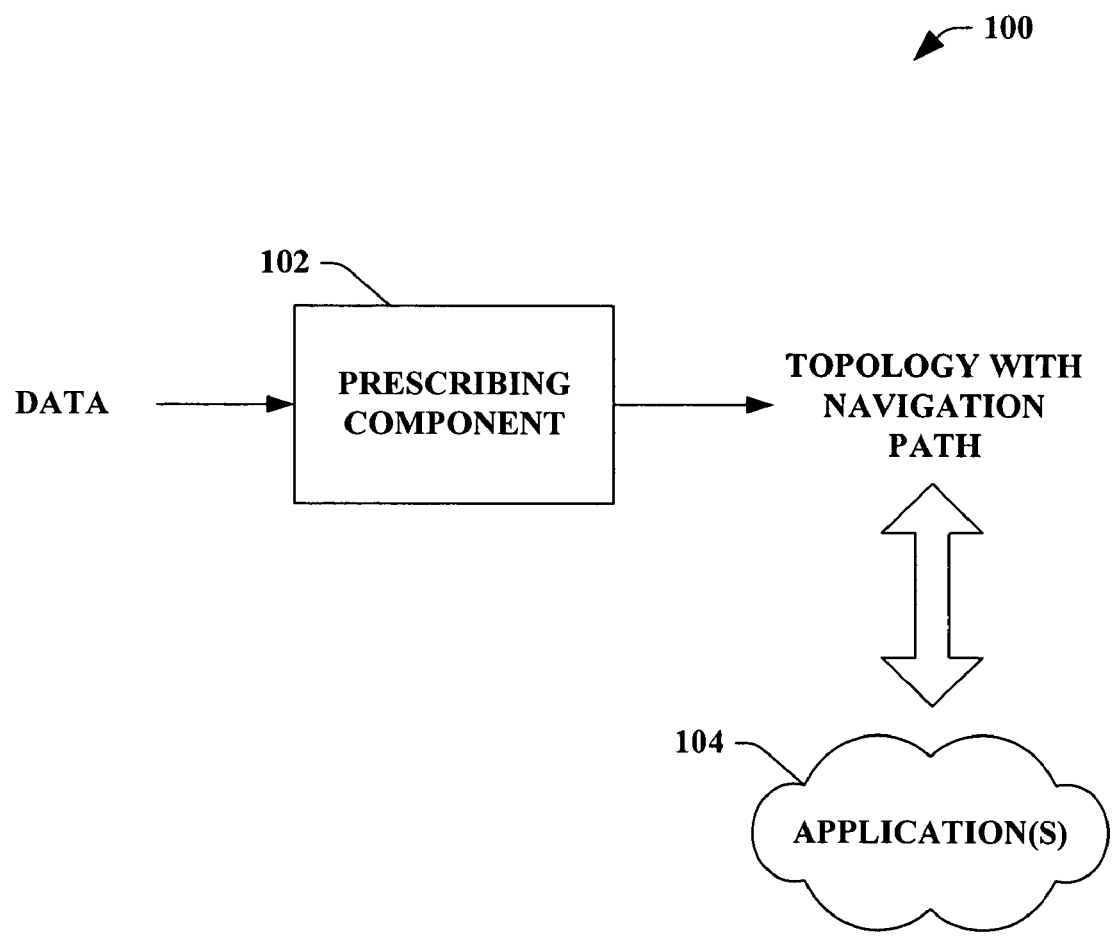
FIG. 1 illustrates a block diagram of an exemplary system that facilitates developing an application utilizing prescribed navigation.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 illustrates a system 100 that facilitates developing an application during design time by utilizing prescribed navigation. A prescribing component 102 can receive data during design time, wherein such data can be metadata (e.g., metadata related to a business framework). During design of an application(s) 104, the prescribing component 102 can create a topology with an associated navigation path based upon the received data. The topology and the navigation path (e.g., NPath) can provide for employment of prescribed navigation in design time that streamlines development of the applications 104. The topology can for example be a metadata instance of a uniquely named collection of links, which is a network of node and link objects—this network represents a subset of traversable objects in paths in the metadata model. Such node or link can reference back to the original metadata.

Once a topology is created by the prescribing component 102, the navigation path, which is a collection of acts to navigate the information topology for a specific application(s) 104 purpose, is employed. The navigation path is a sequential list of links over the topology that represents a sub-graph of a general topology created from the received data. The content of the navigation path defines a graph, while the physical sequence of link objects in the list represents a linear navigation path. It is to be appreciated that the applications 104 can utilize navigation paths by filtering nodes within the topology with an expression. Moreover, such navigation paths typically include a root node, a sequence to support a next functionality (e.g., exploring the next node within a navigation path), a user interface (UI) presentation binding, and a notion of navigation type (e.g., linear, star, or tree).

A topology with a navigation path contains various nodes with associated links. A node is an object that represents a state of navigation, wherein a list of links to other nodes and data contents during navigation is contained. It is to be appreciated that the node within the topology and navigation path can be associated to a model element such as, but not limited to, Entity or EntityCube (discussed infra) where contents are provided. Each node contains node content, which is data bound to a specific node. Moreover, it is to be appreciated the data bound to a node is not limited to a particular node. For instance, data "A" can be bound to node "A", and node "B". Furthermore, the node content can be an entity, EntityCube, and/or query that returns a collection of data or simply a resource upon access. The node content further provides a value and type information, wherein the type content is dynamically assigned at run time when the node value is retrieved. The links between nodes inter-relate one another. A link can contain a unified resource identifier (URI) and references to source and destination nodes. A link object is instantiated, similarly to associated end nodes.

The topology and navigation path created, based upon the data, facilitate use of prescriptive navigation within the application(s) 104. The prescribed navigation during design time shifts the discovery process from run time to design time. By utilizing a topology based on received data and a navigation path, application developers can prescribe navigation paths for an end user such that the user would likely navigate through the content of the application(s) 104. Thus, the topology and navigation paths created by the prescribing component 102 facilitate developing the application(s) 104 by prescribing data exploration/discovery/search into specific paths rather than allowing a user to roam aimlessly. It is to be appreciated that the applications 104 can be, but not limited to, a business application, an application on a computer-readable medium, an application within a business framework, etc.

Figure 2:
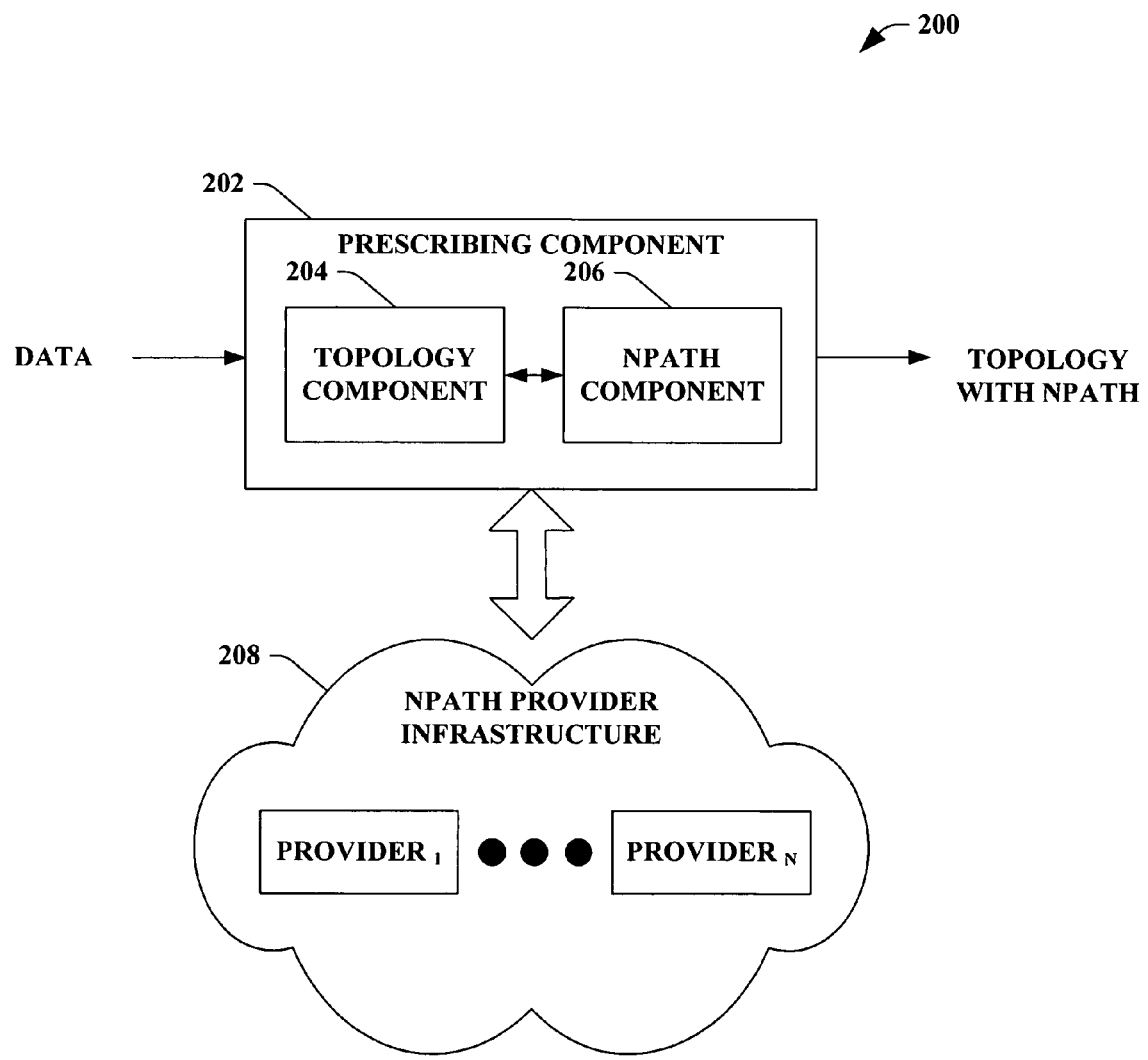
FIG. 2 illustrates a block diagram of an exemplary system that facilitates developing an application utilizing prescribed navigation.

FIG. 2 illustrates a system 200 that facilitates developing an application by prescribing a navigation and/or data exploration within related data. A prescribing component 202 can receive data such as metadata (e.g., metadata related to an application, metadata related to a business framework, . . . ) that facilitates creating a prescribed navigation for an application. Prescribed navigation based upon metadata in design time provides application developers a streamlined development effort using a navigational view. Furthermore, by utilizing a prescribed navigation path within the topology provides that re-usability of modules for a plurality of applications. The prescribing component 202 creates the topology and the navigation path such that the discovery of relationships between data and traversing such data points are done in design time. Traditional navigation technique provide a run time discovery of such relationships and traversing of such data points. Thus, the novelty of the subject invention provides application developers an architecture in which a prescribed navigation facilitates developing an application.

The prescribing component 202 further includes a topology component 204 that creates a topology based upon data such as metadata related to an application. A topology is a metadata instance on uniquely labeled link collection, which is a network of at least one node and at least one link object. The topology component 204 creates the topology such that the network of node and link objects represents a subset of traversable objects and paths. It is to be appreciated that the topology created is a reflection of a conceptual model for a specific application component.

Upon creation, the topology can be re-usable. For instance, the topology component 204 can create a topology based on data, wherein such topology is re-usable by an application and/or a plurality of applications. Moreover, the topology can be re-used by various parts and/or components of an application (e.g., by utilizing a different path for the navigation logic in the application). In one example, the topology component 204 can create a topology such that an application "Salary" and an application "Bonus Report" utilize the substantially similar topology.

The topology contains nodes and associated links. A node is an object to represent a state of navigation containing a list of links to at least another node with data contents. For instance, the nodes can be entities, entity cubes, queries, tasks, and other resources. A link contains a uniform resource identifier (URI) that references to a source and destination node. It is to be appreciated that the topology component 204 can create a topology manually and/or automatically. Thus, the topology component can create a topology based on a user interface (UI) (e.g., manually) or based on a provider(s) (e.g., automatically) or a combination thereof.

The topology component 204 creates a topology allowing a navigation path to be created thereupon that provides the prescribed navigation for an application. The navigation path is created by an npath component 206, wherein the navigation path is a sequential list of links over the topology (e.g., created by the topology component 204) to represent a sub-graph of such topology. For instance, a topology can consist of a plurality of nodes and links, wherein an exploration through a series of related nodes via links can be a navigation path. The content of the navigation path defines the sub-graph while a physical sequence of link object in the list represents a linear navigation path.

The following example is for explanatory purpose, and is not to be a limitation construed on the subject invention. A topology can be created wherein the topology is a transportation network containing stops (e.g., nodes) and connecting roads/streets (e.g., links). A navigation path within the topology can be a specific route from point "A" to point "B." The creation of such prescribed navigation provides a "guided tour" of the transportation network that facilitates moving people from one location to another.

The npath component 206 creates the navigation path such that a sub-set of the topology is utilized. It is to be appreciated that although a sub-set of the topology is prescribed, the sub-set can include the entire topology. Furthermore, the npath component 206 creates the navigation path such that the composition is at least one link and at least one node. The navigation path also contains a root node, a sequence to support next, a user interface (UI) presentation binding, and a user interface (UI) binding metadata (e.g., inherited from the source topology but can be overridden). In addition, the navigation path supports a plurality of navigation and/or exploration types (e.g., linear, star, tree traversal, . . . ). The various navigation types drive navigation path application programmable interfaces (API's) behavior in the runtime for the application.

For instance, linear navigation can be utilized, wherein the links to nodes are sequential in a linear path. In another example, a star navigation type can be utilized. Star navigation, also known as hub and spoke, consists of a number of links jutting outward from a central node. The distribution is routed through the central node (e.g., hub) before reaching the final destination via links to other nodes. Another navigation type supported by the navigation path is, for example, tree traversal. Tree traversal is the process of visiting each node in a tree data structure, wherein a sequential procession of each node is provided. It is to be appreciated that the traversals can be characterized by the order in which the nodes are visited.

Referring still to FIG. 2, the npath component 206 creates the navigation path during design time providing a prescribed navigation within the topology. During design time, the npath component can utilized to create a navigation path out of the topology by identifying a root node and pruning (e.g., deleting) the associated graph (e.g., links and/or nodes). Moreover, during run time applications can create additional navigation path(s) and/or utilize the design time created navigation path. When the application creates the navigation path during runtime, filters are utilized in order to filter node(s) yielding a runtime created navigation path.

The prescribing component 202 provides prescribed navigation utilizing a topology and a navigation path that facilitates developing an application. The navigation path (e.g., sub-graph of the topology) can be populated (e.g., populate nodes and/or links) by a navigation path (e.g., npath) provider infrastructure 208 which includes at least one provider to an Nth provider where N is an integer. The navigation path provider can be a resource provider that accesses a context node via, for example, a transformation and/or information retrieval mechanism (e.g., a meta-model provider for entities, a drill up/down/through/across for Business Intelligence (BI), a task operation or workflow, . . . ).

The navigation path providers (e.g., Provider$_1$ to Provider$_N$) have basic capabilities that provide appropriate functionality to the overall navigation path provider infrastructure 208. The navigation path provider responds to a request with a data context providing node(s) with data (e.g., populated the metadata). The navigation path provider also implements the ability to respond with a set of return types (e.g., DataSets, Objects, XMLs, etc.). Moreover, linking capabilities are provided such as link context (e.g., wherein the provider produces links with a context) and link type (e.g., wherein identity is given to a specific type of providers).

It is to be appreciated that the navigation providers (e.g., Provider$_1$ to Provider$_N$) can provide additional capabilities such as, for example, security token and/or filters (discussed infra). The security token provided can be employed in order to verify and/or authenticate navigation path providers within the navigation path provider infrastructure 208. For instance, a topology can be created based on a metadata, wherein a navigation path is representative of a sub-set of the topology. In order to provide data context to the nodes (e.g., which contain metadata), a navigation path provider can access a context node with a transformation and/or information retrieval mechanism. However, in order to provide security, authenticity, and/or verification, the navigation path provider can utilize a security token.

The navigation path provider infrastructure 208 can include at least one navigation provider, wherein the infrastructure 208 manages communication between client application and at least one navigation path provider. It is to be appreciated that the navigation path provider infrastructure 208 can manage communication between a plurality of client applications and a plurality of navigation path providers. The navigation path provider infrastructure 208 provides plugability, extensibility, and/or delegation capabilities wherein navigation requests are delegated to specific set of providers when the type information is provided. However, when type information is not provided, the infrastructure 208 requests responses by broadcasting requests to Provider$_1$ to Provider$_N$. Furthermore, the navigation path provider infrastructure 208 can provide instantiation for the topology and the navigation path. It is to be appreciated that the instantiation for the topology is for resolving navigation path expression and navigation path are in run time. In addition, it is to be appreciated that code can be generated such that the navigation path is persisted as a set of metadata describing navigation route(s). The set of metadata can be utilized to generate code, wherein the navigation path expression can be composed in a strong typed manner.

Figure 3:
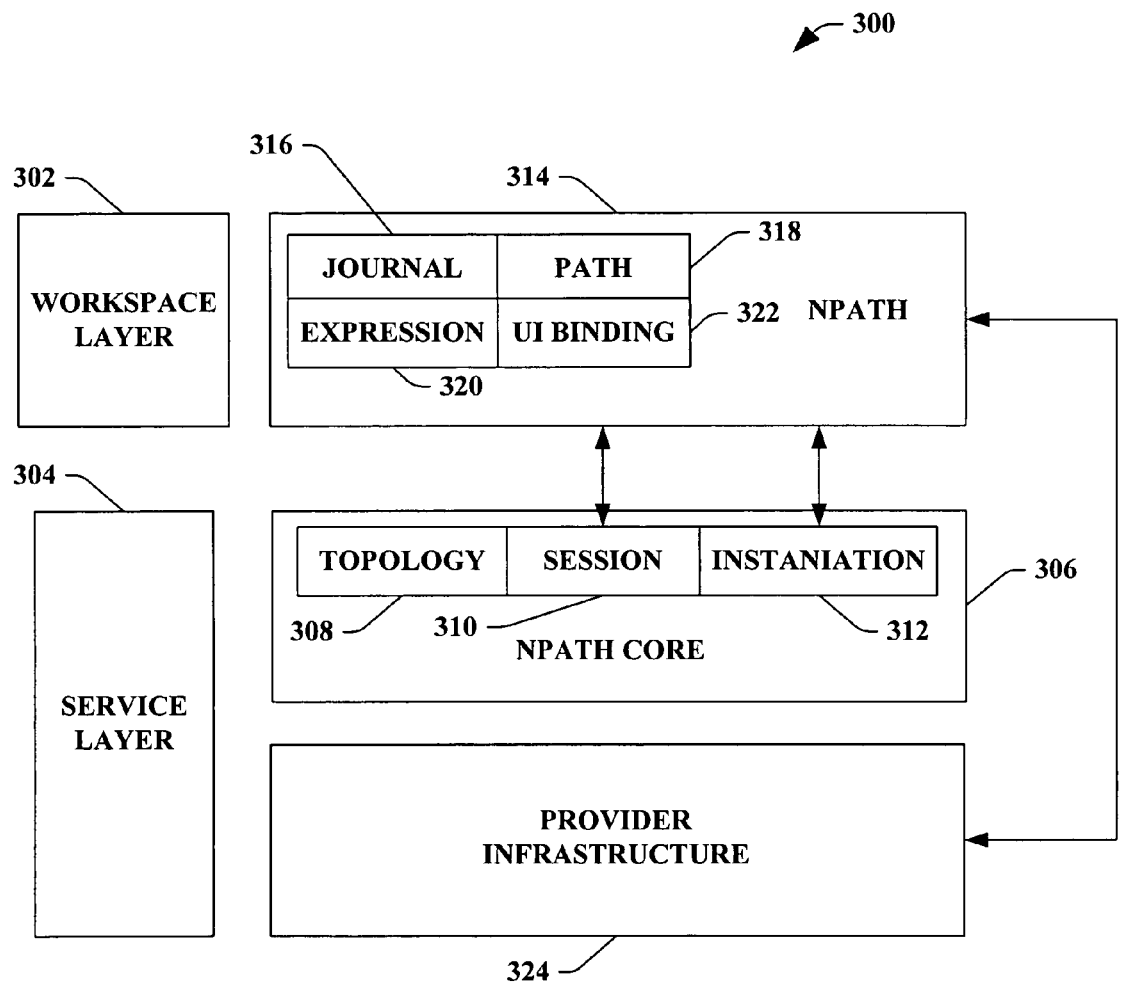
FIG. 3 illustrates a block diagram of an exemplary architecture that facilitates developing an application utilizing prescribed navigation.

Turning now to FIG. 3, an architecture 300 is illustrated that facilitates developing an application during design time by utilizing a prescribed navigation. By creating a topology and a navigation path (e.g., sub-set of the topology) based on metadata received, a prescribed navigation can be implemented allowing streamlined development of an application. The architecture 300 establishes design points such as, but not limited to, enabling high degree of plug-ability and extensibility, focusing on developer and application needs, long-term stability of application programmable interfaces (API's), providing a high level of prescriptive-ness for a business framework navigation, and maximizing business intelligence (BI) and entity metadata values.

The architecture 300 includes a workspace tier 302 and a service layer 304. Within the service layer 304, an npath core 306 is included that facilitates creating a prescribed navigation for an application. The npath core 306 further includes a topology 308, a session 310, and an instantiation 312. The npath core 306 instantiates a topology 308 based upon received data. For instance, the topology 308 can be created based on metadata contained in a metadata store (not shown). As will be discussed in more detail infra the topology 308 can also be created manually or automatically or a combination thereof. Once the topology 308 is instantiated, the npath core 306 instantiates a navigation path 314 (e.g., also referred to as the NPath) from the topology instance by utilizing the instantiation 312. In other words, the instantiation 312 can instantiate the topology 308 and/or the navigation path 314 (e.g., also referred to as the NPath). In one example, the navigation path can be instantiated from the topology instance utilizing a navigation path expression, also referred to as an NPath expression. In yet another instance, code can be generated such that the navigation path is persisted as a set of metadata describing navigation route(s). The set of metadata can be utilized to generate code, wherein the navigation path expression can be composed in a strong typed manner. Also, it is to be appreciated that the navigation path created has a client side and a service side, wherein the navigation path 314 represents the client side, and the navigation path is on the service side (not shown).

Furthermore, the npath core 306 can create a service session for an npath client allowing for a prescriptive navigation within the workspace tier. It is to be appreciated the npath core 306 represents a service layer for the npath client to delegate requests to a provider infrastructure 324. It is to be appreciated the provider infrastructure 324 is the service layer that manages communication between client applications and navigation path providers as discussed supra (e.g., request/response, delegation/broadcasting, registration, . . . ).

The npath 314 resides in the workspace tier, wherein the NPath 314 (e.g., navigation path 314) can utilize a journal 316, a path 318, an expression 320, and a user interface (UI) binding 322. The navigation path client side 314 provides functionality for client applications, such as, for instance: expression 320 contains a strong typed expression to compose an NPath expression to create an instance of a path out of the topology instance in the service; UI binding 322 enables a navigation context sensitive binding between a node and UI components, which is persisted as part of metadata; path 318 contains a programming model that enables navigation on links in the navigation path; and journal 316 provides a journaling functionality to track user navigation and/or the history associated thereto.

In one example, the journal 316 provides a log and/or record to track user navigation within an application. The journal 316 can be utilized in order to prescribe navigation within an application and to facilitate developing a topology with navigation path(s) to better discover relationships and traverse data points. For example, the journal 316 can track a particular user's navigation within a topology, or possibly outside of the topology due to run time ad hoc exploration, during a session such that a log and/or record are created wherein such record and/or log can facilitate developing an application.

Figure 4:
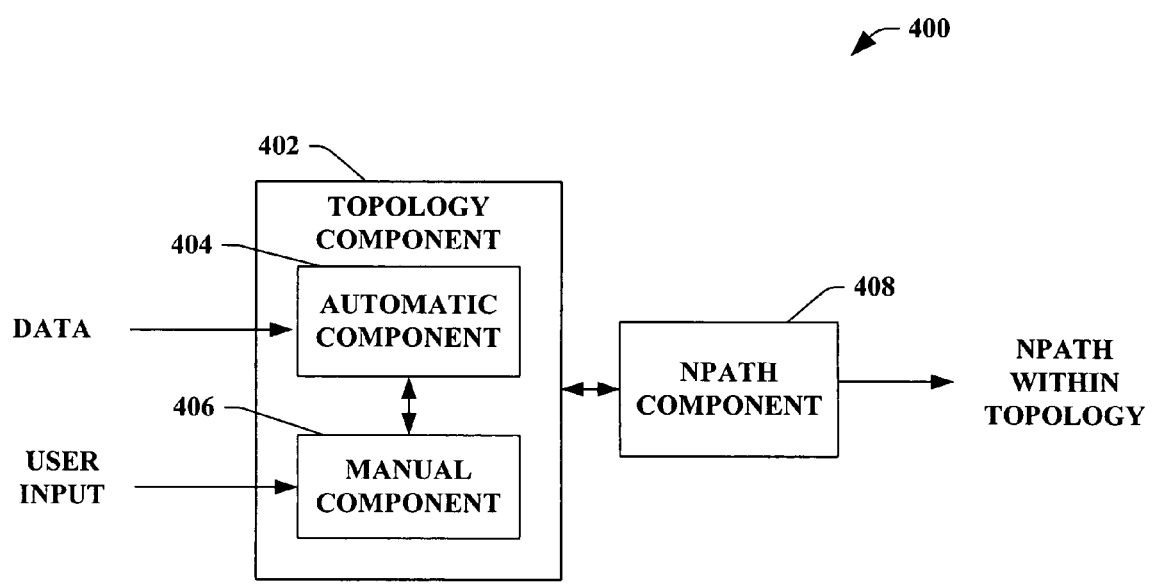
FIG. 4 illustrates a block diagram of an exemplary system that facilitates developing an application utilizing prescribed navigation.

FIG. 4 illustrates a system 400 that facilitates developing an application by utilizing a prescribed navigation including a topology and a navigation path. The topology component 402 creates the topology either by utilizing an automatic component 404 or a manual component 406 or a combination thereof. The automatic component 404 receives data, wherein a topology can be created. The shape and collection of links and nodes can be determined by a provider and/or a plurality of providers. For instance, the topology can be created from an entity graph (e.g., topology created directly from metadata). The topology can be created from an entity model by examining entity metadata in information management system (IMS). It is to be appreciated that entity types are nodes, wherein associations and compositions form the links among such nodes. The business entity provider is responsible for these nodes and links.

In another example, the topology can be automatically created from business intelligence (BI) data. Thus, cubes, dimensions, and measures are nodes, with the addition of a business criteria instance (e.g., a multidimensional expression (MDX) statement) is also a node. The links among the above nodes can be, for instance, drill-up, drill-down, drill-across, etc. as implemented by at least one business intelligence (BI) provider. It is to be appreciated that the topology automatically created also covers the relationship between business intelligence (BI) metadata and entity metadata. Moreover, in different example, the automatic component 404 can create the topology based on a business intelligence (BI) journal. The journal can be, but not limited to, submitted to the navigation service wherein a topology can be created by converting the journal by removing duplicate entries.

The manual component 406 can receive a user input via user interface tools allowing the topology to be created and/or modified manually. For example, a link can be added to represent a logical associated between two entities with the following code:

```
Topology myTopology = new Topology("myTopologyName", typeof(Order));
//add a link between Order and Customer with a link category "Entity"
myTopology.AddLink(typeof(Order), typeof(Customer), "Entity");
//add a link between Order and OrderLine with a link category "Entity"
myTopology.AddLink(typeof(Order), typeof(OrderLine), "Entity");
//add a link between OrderLine and Product with a link category "Entity"
myTopology.AddLink(typeof(OrderLine), typeof(Product), "Entity");
//add a link between Order and SalesEntityCube with a link category "DrillUp"
myTopology.AddLink(typeof(Order), typeof(SalesEntityCube), "DrillUp");
//add a link between SalesEntityCube and ProductEntityCube with a link category
"DrillAcross"
myTopology.AddLink(typeof(SalesEntityCube),typeof(ProductEntityCube),
"DrillAcross");
...
//save the topology back to server side
myTopology.Save( );
```

The code above creates a topology with the name "myTopologyName," with a root node having the type Order. Throughout the code, various links are added between nodes, and then the topology is saved back to a server side. It is to be appreciated that the code above is commented, wherein such comments are prefaced with "//."

It is to be appreciated that the manual component 406 and the automatic component 404 can be utilized in conjunction in order to create a topology. For instance, the topology can be provided automatically based on the techniques described above, yet a user can utilize a user interface to edit the automatically provided topology. Thus, customization of a topology is possible and available to specifically tailor to an individual.

The topology created can then be utilized to create a navigation path by the npath component 408. The navigation path created is a sequential list of links over the topology to represent a sub-graph of the topology (e.g., created automatically by the automatic component 404, created manually by the manual component 406, or a combination thereof). It is to be appreciated that a navigation path can be created utilizing a persisted journal, wherein the journal is automatically utilized and/or manually utilized. The content of the npath defines a graph while the physical sequence of link object in list represents a linear navigation path. Furthermore, the navigation path and the topology path facilitate developing an application by utilizing prescriptive navigation within such application.

Figure 5:
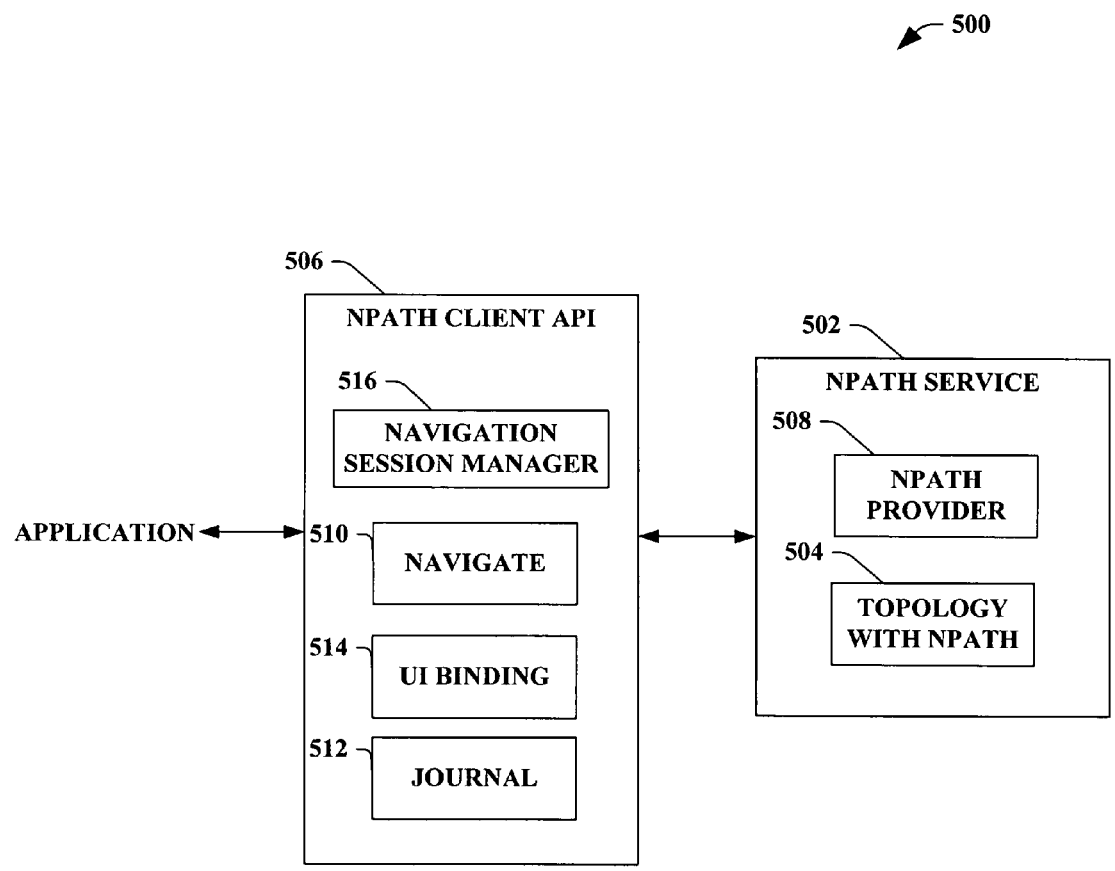
FIG. 5 illustrates a block diagram of an exemplary system that facilitates prescribing navigation within an application.

FIG. 5 illustrates a system 500 that facilitates prescribing navigation within an application. An npath service 502 can include a topology with a navigation path(s) 504 wherein a prescribed navigation path is determined. However, before initialization, a navigational path contains only metadata (e.g., from which the topology is based upon) and no data. The root of the node must have data instances in order to be traversed. An application must utilize an npath client application programmable interface (API) 506 to get a data instance, wherein the application provides the context and submits such context to the npath service 502. The npath service 502 can provide a root node data value to the npath client API 506 which provides the application with such value. It is to be appreciated the root node value is the initial context for the navigation path to be navigated. Once application sets the initial context, the typed context can be obtained by an npath provider 508. The root node can be initialized with a data view in a variety of techniques. For example, an injection of a link to the root node can provide the initial context as seen in the following code:

```
NPath navPath = NPath.CreateInstance(...);
OPath opath = "CustomerID=1234";
NavLink initLin =
navPath.CreateLink(Navigate://entity.provider?...Querytype="Opath",
Query =
opath ...");
navPath.RootNode.GetData( initLink, null);
```

It is to be appreciated that the notion of injecting links is beneficial when views of the context node in an application are dynamically changing. Moreover, the links can transform the view from one to the other using the same context node.

The npath client API 506 provides a variety of functionality to the system 500 in order to facilitate prescribing navigation within an application. The npath client API 506 includes a navigate 510 that provides a plurality of navigation. The navigate 510 can provide an npath sequential navigation, wherein the npath sequential navigation allows the application to sequentially travel down the navigation path with minimal path discovery. It is to be appreciated that the interaction with the npath service 502 is to obtain node contents by calling a TraverseLink( ). For instance, once a connection can be established allowing a client to connect to the npath service 502. The navigation path is then instantiated by calling the npath service 502 with a topology name, a starting node, an npath expression, and a traversal strategy to get the instance of the navigation path. The application can then navigate utilizing "Next" on the navigation path from the starting node. The sample code below is a typical example of an application:

```
NPath myPath = new NPath("myTopologyName", myExpression);
//Next Button Click handler
... NextButtonOnClick(...)
{
    //traverse the next link
    myPath.Next( ).Traverse(dataContext);
}
```

Furthermore, navigate 510 can provide an npath sub-tree navigation, wherein the application navigates within the links of direct children in the given npath context node. It is to be appreciated that there is no path discovery, and the interaction with npath service 502 allows the reception of node contents. The client connects to the npath service 502, wherein an npath is instantiated that allows navigation when the application calls Traverse( ). It is to be further appreciated that typical examples are form-based applications with hot-links on displayed data and/or button controls. Hot-links, for instance, are dynamically activated when a path exists from a starting node to a link destination node.

Figure 6:
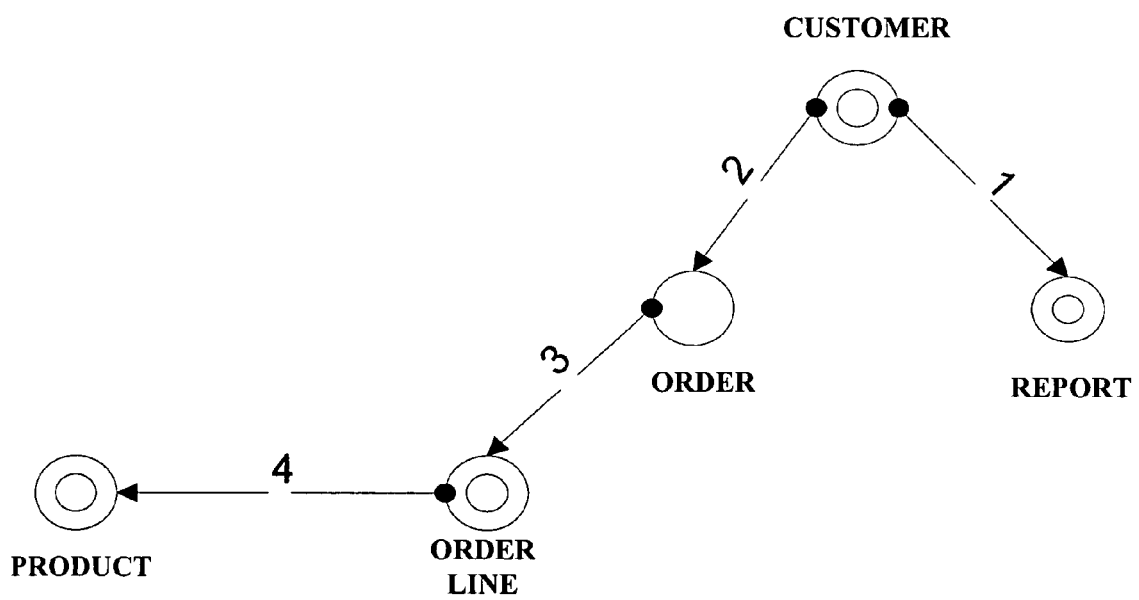
FIG. 6 illustrates diagram containing a starting node and associated links.

Referring to briefly to FIG. 6, an online order application can include the forms: customer, sales report, order, orderline, and product. The navigation path for an application can be [<customer, report>, <customer, order>, <order, orderline>, <orderline, product>]. The navigation path is depicted in FIG. 6, containing the forms. The npath service 502 can return the navigation path based on the topology and expression specified by the application.

Figure 7:
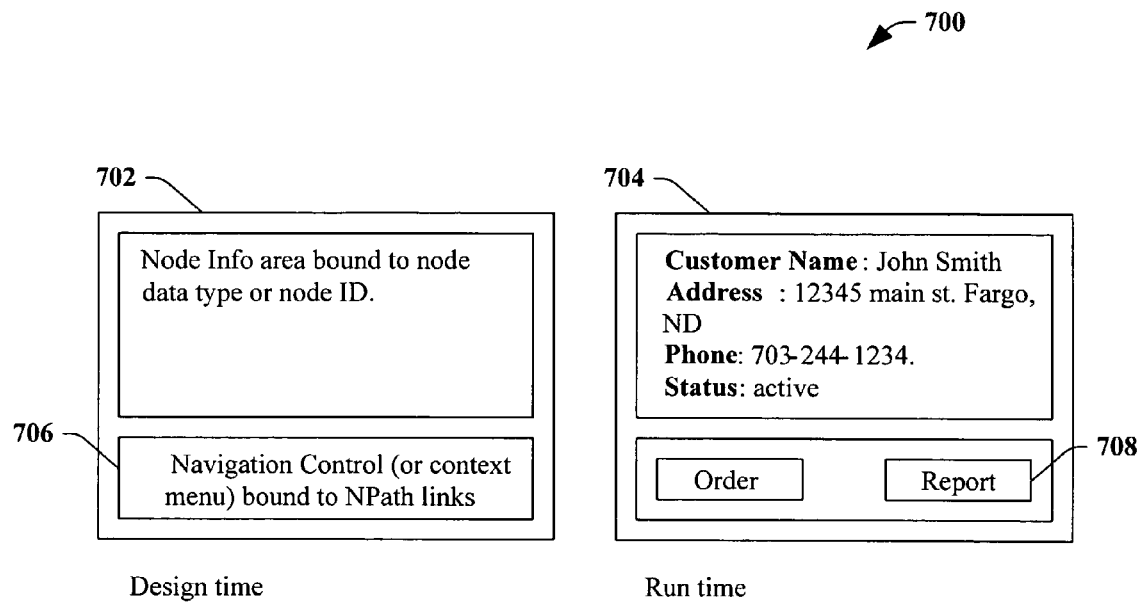
FIG. 7 illustrates a block diagram of customer forms with nodes that facilitates developing an application utilizing prescribed navigation.

In another example, the application can utilize a set of disconnected user interface (UI) elements (e.g., Winform) at a client side, wherein the elements are bound to at least one node in a navigation path individually. Referring to FIG. 7 briefly, the user interface (UI) elements 700 can be a design time illustration of a customer order form 702 and a run time illustration of a customer order form 704. For example, a Customer form UI can be bound to the Customer node in the navigation path independent of a specific application but specific to a navigation context, such as, data source type, the navigation link type, or user inputs of any form. Insides this Customer form example, UI controls are dynamically generated based on the npath in metadata. In this example, the two navigation path button controls in the customer order forms can be prescribed to bind the node data to UI controls such as report chart, order form, orderline datagrid, etc. During run time, traversing a customer node activates the form that matches the given navigation context, wherein the node data is presented and links that are traverse-able form the source are populated in the navigation control area 706.

Continuing with the above example, a report button 708 can be created by an application developer and/or by an npath client API automatically. When the report button 708 is activated, the link <customer, report> link is traversed. The npath can then load report data and display the report chart user interface (UI). The report chart can be, for instance, a modal dialog box, a modeless form, and/or an in-place docked control. Additionally, the order form can have various controls to display order detail collections (e.g., derivatives of data grid controls). The order detail control can be a child of the order form so that the link <order, orderline> is traversed automatically as order is traversed. The existence of link <orderline, product> enables a hypertext link on the product column of order lines. The above can be demonstrated by the following code:

```
NPath myPath = new NPath("myTopologyName", myExpression);
//get all the out bound links from root within the NPath
List<Link> outBoundLinks = myPath.Root.OutBoundLinks;
//traverse the 5th link
outBoundLinks[4].Traverse(dataContext);
```

Referring back to FIG. 5, the navigate 510 can provide topology navigation, wherein an application explicitly requests discovery of links outside a navigation path but within the given topology. The navigate 510 can utilizing GetPath( ) on a known node. The application can call GetPath( ) on a node to obtain the links that are in scope of the topology without the accessing an npath provider 508. The links returned are in a form of a new npath instance. It is to be appreciated the application can add returned links into a journal 512 selectively (discussed infra). The above can be demonstrated by the following sample of code:

```
NPath myPath = new NPath("myTopologyName", myExpression);
//get all the out bound links from root within the NPath
List<Link> outBoundLinks = myPath. myPath.Root.OutBoundLinks;
//traverse 5th Link from outBoundLinks
outBoundLinks[4].Traverse(dataContext);
//adhoc get links from current topology
NPath adhocPath =
outBoundLinks[4].Destination.GetPath(someExpression,
SearchScope.CurrentTopoloy);
//traverse the 1st adhocLink, and this link navigation information
will be kept in journal
adhocPath.Links[0].Traverse(newDataContext);
```

An ad-hoc navigation is substantially similar to topology navigation, yet the discovery scope is at a npath provider level. The ad-hoc navigation can be implemented by the navigate 510 by the following code sample:

```
NPath myPath = new NPath("myTopologyName", myExpression);
//get all the out bound links from root within the NPath
List<Link> outBoundLinks = myPath. myPath.Root.OutBoundLinks;
//traverse 5th Link from outBoundLinks
outBoundLinks[4].Traverse(dataContext);
//adhoc get links from current topology
```

-continued

```
NPathadhocPath=outBoundsLinks[4],Destination.GetPath(someExpression,
SearchScope.UniversalTopology);
//traverse the 1st adhocLink, and this link navigation information will be kept in
journal
adhocPath.Links[0].Traverse(newDataContext);
```

The npath client API 506 can further include a journal 512 that allows the recordation of history of navigation. The journal 512 can record the history of a navigation regardless of the navigation path used. The journal 512 can be opened to allow the recording of the navigations which proceed until the journal 512 is closed. The journal 512 can be saved in, for instance, a local file upon closing. In one example, an application upon activation can determine whether a journal file is located in a configuration file in order to load the journal history. When such application is de-activated, the journal 512 can be saved in the substantially similar file.

Furthermore, the journal 512 contents can be uploaded into a topology, wherein such journal contents can append, replace, or override the topology. It is to be appreciated that the connection can have right to write onto metadata. For instance, a journal 512 can create a history of navigation for a user wherein such history can be the basis of the topology and navigation path creation allowing the prescribed navigation to facilitate developing an application. The journal 512 can be updated by navigation activity upon activation; thus all navigation activity is recorded. The main functions for a journal 512 are "Back" and "Forward."

Figure 8:
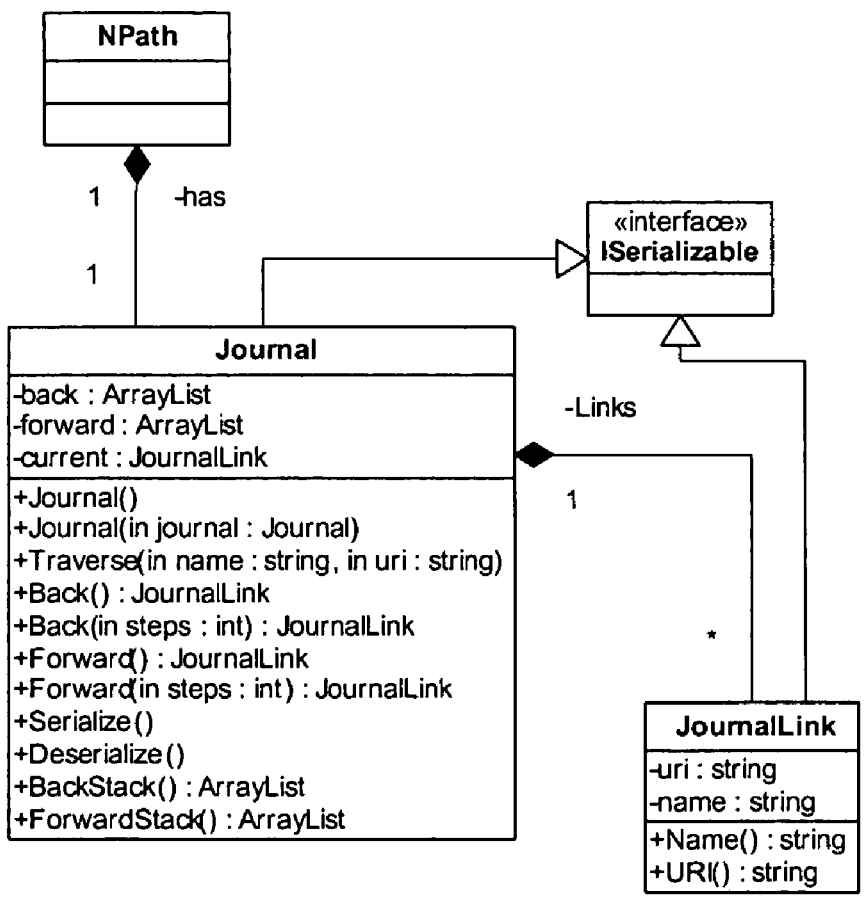
FIG. 8 illustrates a block diagram of an object model that facilitates developing an application utilizing prescribed navigation.

Referring briefly to FIG. 8, a design overview is given for a journal, wherein the journal object model 800 encapsulates the pages navigated/visited by a user. The journal object model 800 contains a Journal object which provides a variety of attributes and operations. A back attribute provides the links the user can navigate backwards to and can be implemented as an array rather than a stack for flexibility. A forward attribute allows the links the user can navigate forward to, which also can be implemented as an array instead of a stack for flexibility. Another attribute, current provides the current link or page that is currently being visited (e.g., it does not belong to either the forward or back list of links). The journal object further provides operations such as, for instance, journal (e.g., construct a journal object), journal (e.g., copy constructor), traverse (e.g., navigate to a new link or page where the current page is pushed onto the back stack and the current page is set to the new page), back (e.g., go backwards one page), back (e.g., go backwards the number of pages specified), forward (e.g., go forward one page), forward (e.g., go forward the number of pages specified), serialize (e.g., save the journal to an XML stream), deserialize (e.g., load the journal form an XML stream), backstack (e.g., return the array of pages in the back array, which does not include the current page), and forwardstack (return the array of pages in the forward array, which does not include the current page). Moreover, the journal object model 800 contains a JournalLink object that encapsulates the information needed to recreate a page visited by the user. For instance, the JournalLink object contains a name (e.g., the name of the page which can be used to display the journal nodes to a user) and a URI attribute (e.g., the URI that describes the link the user traversed to get to this page, wherein the URI contains the context data). The JournalLink object provides operations such as, for example, name (e.g., return the name of the page) and URI (e.g., return the URI that created the page, wherein the UR page type together with the URI can recreate the page).

The npath client API 506 can further include a UI binding 514. The graphic user interface (GUI) application can be based on the navigation path substantiated; yet displaying the user interface (UI) for a node upon navigation is done with the npath client API 506. For example, a developer can write a user interface control (e.g., a page) in a client component over npath client API 506 can bind it to a type described in the business framework metadata. The page can implement an interface to communicate to the npath client API 506. It is to be appreciated the traversal of the navigation path occurs from the data instance of the root node. Yet, application(s) need to provide the context data, which is done by a construct data search criteria of the types specified by the navigation path.

When a page binds to a node in the topology via the UI binding 514, the view of a node content is determined. Moreover, a binding determines the particular page run-time behavior, such as how it is activated or the relationship with other controls on display. For example, a binding determines if the user interface (UI) control is modal or modeless, or in-place control. It is to be appreciated that the page can have other in-place pages as child pages (e.g., provided the nodes of child page are reachable from the parent page node). The traversal can take place when the parent page is loaded.

The UI binding 514 provides the registration of pages (e.g., registration with, for instance, a navigation manager), default UI binding (e.g., one for single data instance that is property page-like and one for collections that is a data grid), type based UI binding (e.g., registering a page as a type based binding that overrides the default binding), node based UI binding (e.g., page matching to the type and node id when there is more than one page available), link based UI binding (e.g., page matching to the type, node id, and link when there are multiple pages available), binding context (e.g., registration of pages and providing a binding context allowing multiple pages to be registered for one type or one node).

The npath client API 506 can include a navigation session manager 516 that facilitates navigating services. The navigation session manager 516 is a singleton object in npath client API 506 that can manage navigation path(s), journal 512, pages, and UI binding 514 at a presentation tier. Upon initialization of an application, the npath client API 506 can connect to a navigation service (not shown) for the application, wherein the connection requires input parameters such as, for instance, business framework account name, password, etc. Once authentication of the user is provided by the service side, the connection handle/object for the session is returned. It is to be appreciated that the authentication can be provided by the business framework.

The navigation session manager 516 can call the npath service 502 to get a navigation path instance returned. In order to instantiate a navigation path, the application provides, for example, the following parameters: a topology name, a starting node instance, a navigation strategy, and an expression string or object model (OM). The topology name is a unique name of a topology. A nameless topology is simply a returned navigation path containing only the starting node and the first level child nodes as a result of discovery. A starting node instance provides the starting point for a node. The starting node instance is not necessary if criterion can uniquely identify the starting node of an absolute path from the root. Yet, an application may not contain information regarding the topology nor the absolute path to a node, in which can the node is identified first. The navigation strategy is the technique utilized in navigation. With a list of links, the connectivity of a graph is fixed, yet traversing from the starting node is different. In other words, two or more navigation paths utilize the substantially similar links yet different navigation sequence provided by the application. For instance, possible sequences are depth first (linear on a sequentially connected links), breadth first, or star (e.g., use connectivity rather than sequence). The expression string or object model (OM) is an XPath-like expression with object model support to identify the path over a topology.

Figure 9:
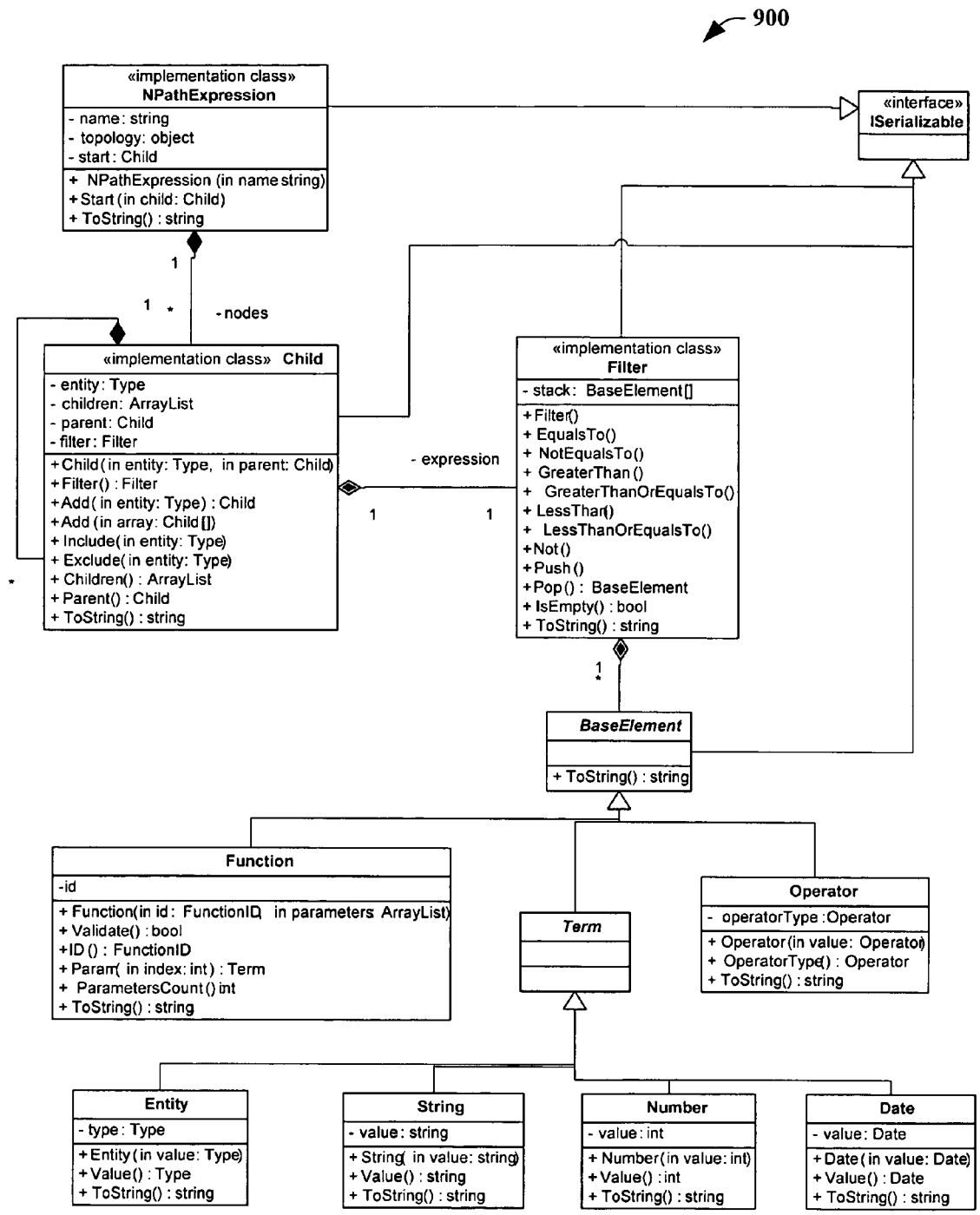
FIG. 9 illustrates a block diagram of an object model that facilitates developing an application utilizing prescribed navigation.

FIG. 9 illustrates an object model 900 that facilitates developing an application by utilizing prescribed navigation. The object model contains an NPathExpression class which implements an ISerializable interface to support serialization to XML. The NPathExpression class contains a chain or tree of element objects with various attributes and operations. For instance, attributes associated to NPathExpression is name (e.g., the name for the path which is unique), start (e.g., the first element of the path which can refer to a relative path or absolute path depending on the element properties). The NPathExpression can utilize operations such as, but not limited to, NPathExpression (e.g., constructor), start (e.g., property, sets or returns the first element of path), and ToString (e.g., returns an XPath-like expression string representation of the NPathExpression).

The object model 900 further includes an Element class wherein, the Element class implements the ISerializable interface to support serialization to XML. Moreover, the element class encapsulates an XPath's element and contains a filter and a chain or tree of other element objects. Element contains attributes such as, but not limited to, entity (e.g., the business intelligence entity, where if null and first element in the path it is a relative path; if null and the element is not the first node it is a parent node), children (e.g., the next element in the path), parent (e.g., the parent to this element), and filter (e.g., the filter expression to filter subsequent sub-trees). The Element class can provide operations such as, for instance, element (e.g., constructor), filter (e.g., return the filter), add (e.g., append an element to the path, wherein the element is added to the children attribute of the current element), add (e.g., append an array of elements to the path, thus to create union of sub-trees), include (e.g., help function to include an element and its sub-tree to the path), exclude (e.g., help function to exclude an element and its sub-tree to the path), children (e.g., read-only property that returns the children array), parent (e.g., read only property that returns the parent of the element), and ToString (e.g., returns an XPath-like expression representation of the element and can be called recursively by NPathExpression).

Furthermore the object model 900 contains a filter class which implements the ISerializable interface to support serialization to XML. A filter contains a stack of terms, operators and functions that make up the filter expression. The filter calls can contain the stack attribute which provides a stack representative of the post-fix order of the filter expression. The filter class can also provide operations such as, for example, filter (e.g., constructor), equalsto (e.g., helper method), notequalsto (e.g., helper method), push (e.g., internal use that pushes the term or operator onto the post-fix stack), pop (e.g., inter use that removes the top term or operator from the post-fix stack), isempty (e.g., returns true if the stack is empty), and tostring (e.g., return an XPath-like expression representation of this filter and can be called recursively by element).

Figure 10:
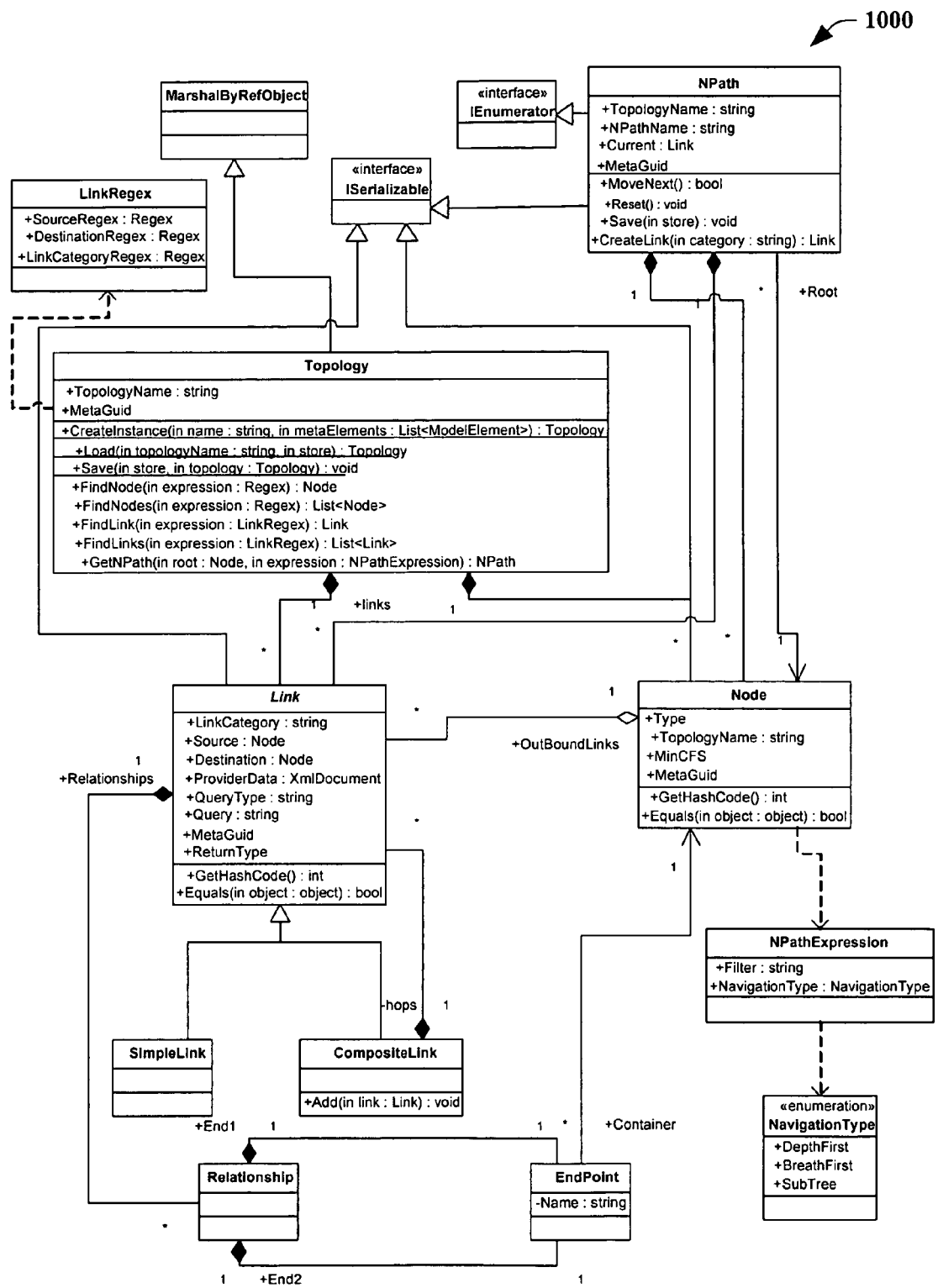
FIG. 10 illustrates a block diagram of an object model that facilitates developing an application utilizing prescribed navigation.
Figure 11:
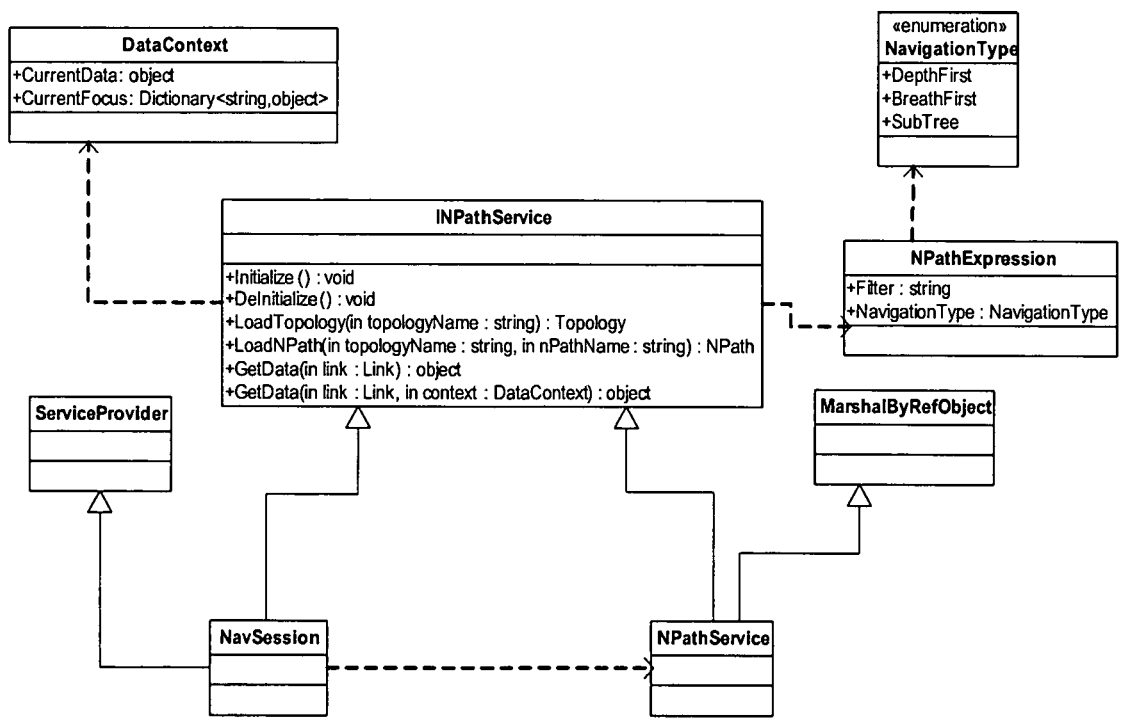
FIG. 11 illustrates a block diagram of an object model that facilitates developing an application utilizing prescribed navigation.

FIGS. 10 and 11 illustrate object models 1000 and 1100 that facilitate developing an application by employing a prescribed navigation, wherein topology generation services are utilized. The object model 1000 contains a topology class that is derived from MarshalByRefObject based in part upon the topology residing on the server and client-reference accessibility. A navigation path is derived from ISerializable, wherein value can be passed around. It is to be appreciated that if navigation path resided on server, navigation path's MoveNext ( ) function call would be remote and performance would be lacking causing a plurality of issues.

Utilizing the object model 1000 and 1100, a topology can be created from an entity cube wizard. A topology can be created, stored, and then loaded by a client. The following code illustrates the creation, storing and loading by a client:

```
Topology toplogy = Topology.CreateInstance("MyTopologyName",
modelElements);
topology.Save(store); //or Topology.Save(store, topology);
Load topology by client.
Topology toplogy = navSession.LoadTopology("MyTopologyName");
```

A navigation path can be created, wherein a navigation instance can be created from, for example, a model viewer. The topology can be created, a root node can be located, and a navigation path expression can be created utilizing the navigation path and navigation type. Upon creation, the navigation path can be obtained, and saved back to the store. It is to be appreciated that code can be generated such that the navigation path is persisted as a set of metadata describing navigation route(s). The set of metadata can be utilized to generate code, wherein the navigation path expression can be composed in a strong typed manner. The navigation path can be loaded by the client. The above can be illustrated by the following code:

```
Topology toplogy = Topology.Load("MyTopologyName", store);
Node root = topology.FindNode(nodeRegex);
NPathExpression expression = ...;
NPath path = topology.GetNPath(root, expression);
path.Save(store, "myPath");
NPath path = navSession.LoadNPath("MyTopologyName",
"MyPathName");
```

Figure 12:
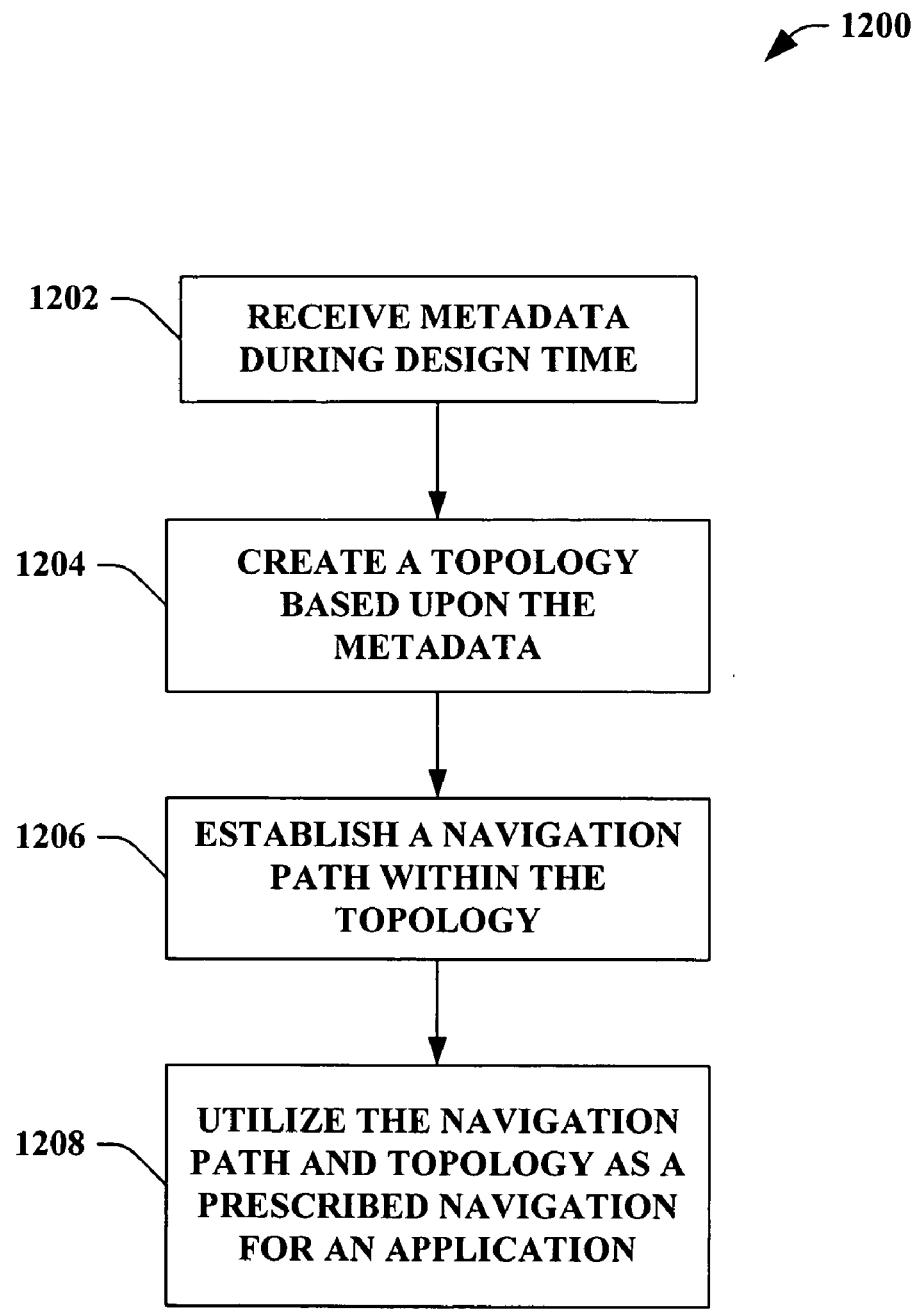
FIG. 12 illustrates a flow chart of an exemplary methodology that facilitates developing an application utilizing prescribed navigation.
Figure 13:
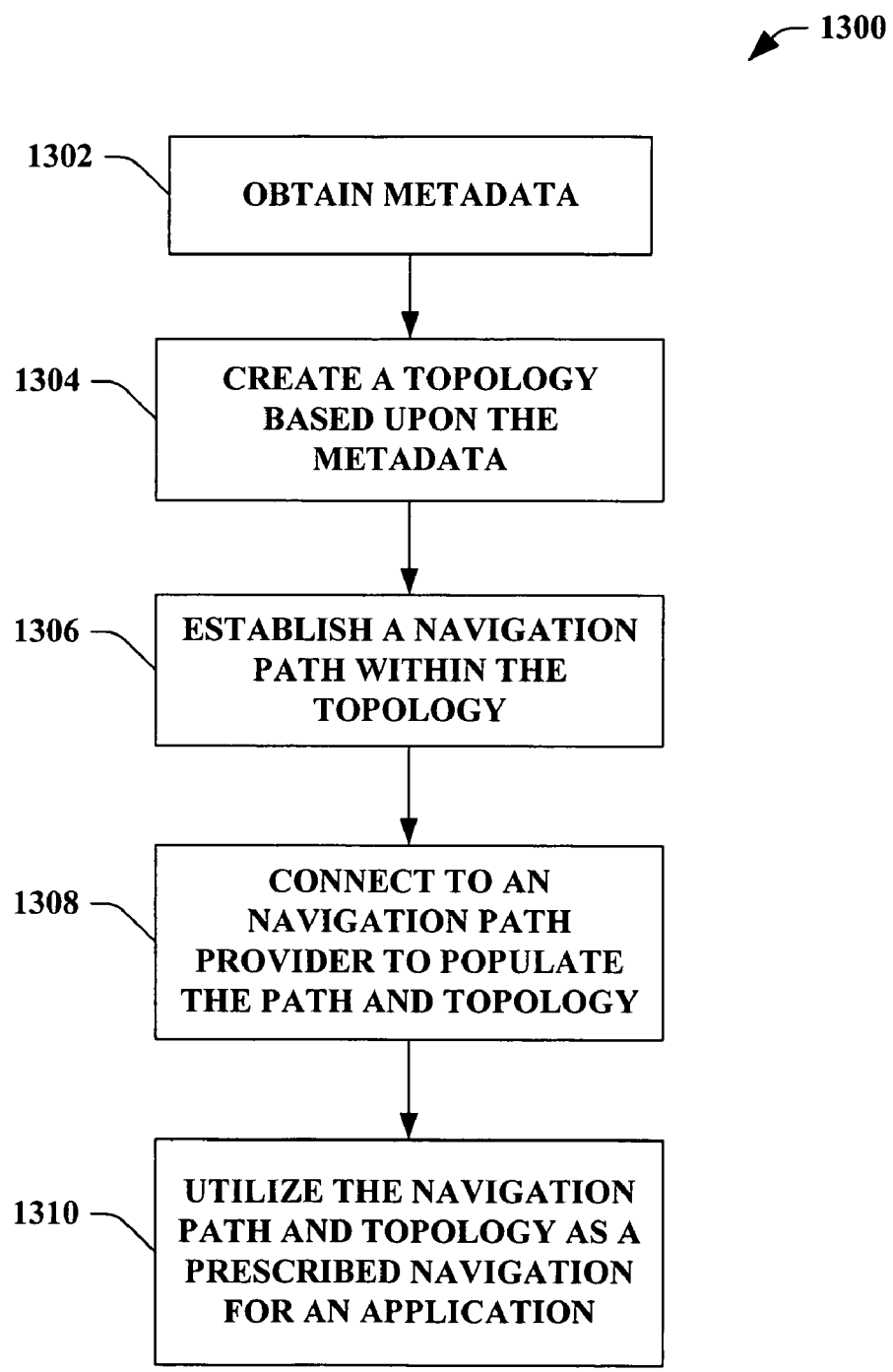
FIG. 13 illustrates a flow chart of an exemplary methodology that facilitates developing an application utilizing prescribed navigation.
Figure 14:
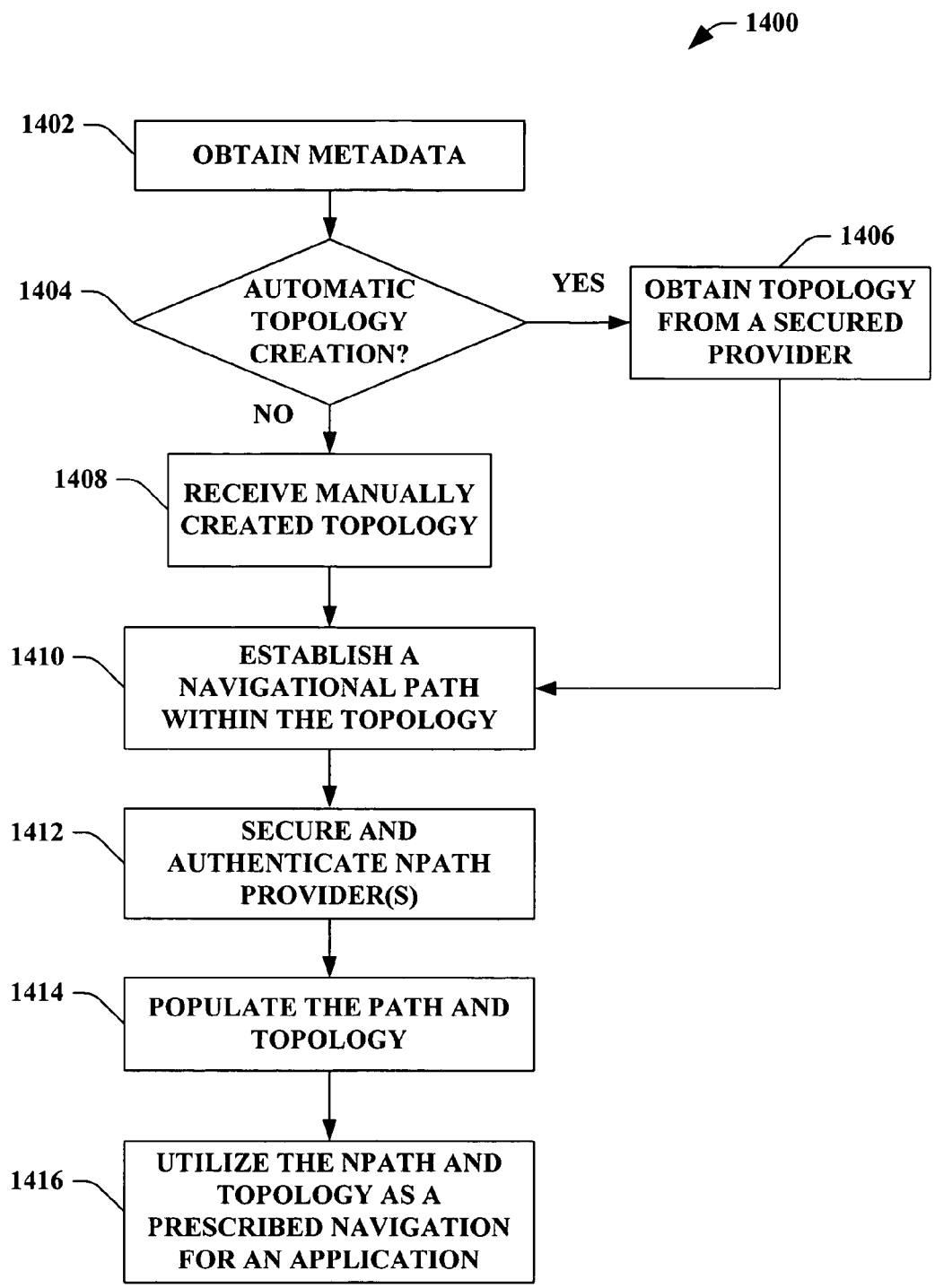
FIG. 14 illustrates a flow chart of an exemplary methodology that facilitates developing an application utilizing prescribed navigation.

FIGS. 12-14 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 12 illustrates a methodology 1000 that facilitates prescribing navigation by utilizing a topology and a navigation path. At 1202, metadata is received during a design time, from which a topology is created at 1204. The topology is a metadata instance of uniquely named collection of links (e.g., a network of node and link objects). For instance, a topology can be created automatically (e.g., from an entity graph, business intelligence metadata, business intelligence journal, . . . ) or manually (e.g., with the assistance of user interface tools, . . . ) or a combination thereof. Next at 1206, a navigation path is established within the topology. A navigation path is a sequential list of links over the topology created at 1204 to represent a sub-graph of such topology. The content of the navigation path defines a graph while the sequence of link objects in the list represents a linear navigation path.

At 1208, the navigation path and topology is utilized for prescribed navigation for an application. The navigation path and topology can be utilized by, for instance, a navigation path service including a navigation path provider further including a provider infrastructure. The navigation path contains a root node that is populated with data instances by the navigation service. Once populated, the application can utilize the navigation path and topology for navigation (e.g., wherein the navigation is based on the prescribed navigation). Such navigation can be, for example, sequential navigation, navigation sub-tree navigation, ad-hoc navigation, topology navigation, journal navigation, etc. Furthermore, the navigation path and topology can be utilized in conjunction with a navigation path expression (e.g., object model created during design time). The navigation path expression contains elements and filters, wherein sub-trees can be added or excluded from the path. It is to be appreciated that expressions can be added to each element to programmatically prune the path. In addition, code can be generated such that the navigation path is persisted as a set of metadata describing navigation route(s). The set of metadata can be utilized to generate code, wherein the navigation path expression can be composed in a strong typed manner.

FIG. 13 illustrates a methodology 1300 that facilitates prescribing navigation by utilizing a topology and a navigation path. At 1302, metadata is obtained, for instance, during a design time. At 1304, a topology is created based at least upon the metadata obtained. The topology is a metadata instance of uniquely named collection of links (e.g., a network of node and link objects). In one example, a topology can be created automatically (e.g., from an entity graph, business intelligence metadata, business intelligence journal, . . . ) or manually (e.g., with the assistance of user interface tools, . . . ) or a combination thereof. Next at 1306, a navigation path is established within the topology. A navigation path is a sequential list of links over the topology created at 1304 to represent a sub-graph of such topology. The content of the navigation path defines a graph while the sequence of link objects in the list represents a linear navigation path.

At 1308, a connection to a navigation path service (e.g., a navigation path provider having a navigation path provider infrastructure) is provided wherein a variety of services can be offered to an application. For instance, the application can connect to the navigation path service that verifies, and provides contextual data to the navigation path and topology (e.g., a root node is populated with data instances by the navigation service). Once connected and/or verified to a navigation path provider and/or navigation path service, the navigation path and/or topology is utilized as a prescribed navigation for an application at 1310. Such navigation can be, for example, sequential navigation, navigation sub-tree navigation, ad-hoc navigation, topology navigation, journal navigation, etc. Furthermore, the navigation path and topology can be utilized in conjunction with a navigation path expression (e.g., object model created during design time). The navigation path expression contains elements and filters, wherein sub-trees can be added or excluded from the path. It is to be appreciated that expressions can be added to each element to programmatically prune the path. In addition, code can be generated such that the navigation path is persisted as a set of metadata describing navigation route(s). The set of metadata can be utilized to generate code, wherein the navigation path expression can be composed in a strong typed manner.

FIG. 14 illustrates a methodology 1400 that that facilitates prescribing navigation by utilizing a topology and a navigation path. At 1402, metadata is obtained, wherein a topology can be based. At 1404, a determination is made whether the topology is created automatically. If automatic creation of the topology is determined, the method proceeds to 1406, where topology is obtained from a secured provider. If automatic topology is not determined, the topology is manually created at 1408. It is to be appreciated that the methodology can provide a combination of a manual created topology with an automatic created topology.

At 1410, a navigation path is established within the topology created (e.g., automatically, manually, or a combination thereof). Once established, navigation path providers (e.g., navigation path services) are secured and/or authenticated at 1412 providing the population of the navigation path and topology at 1414. Once connected and/or verified and/or populated, the navigation path and topology is utilized as a prescribed navigation for an application at 1416. Such navigation can be, for example, sequential navigation, navigation sub-tree navigation, ad-hoc navigation, topology navigation, journal navigation, etc. Furthermore, the navigation path and topology can be utilized in conjunction with a navigation path expression (e.g., object model created during design time). In addition, code can be generated such that the navigation path is persisted as a set of metadata describing navigation route(s). The set of metadata can be utilized to generate code, wherein the navigation path expression can be composed in a strong typed manner. The navigation path expression contains elements and filters, wherein sub-trees can be added or excluded from the path. It is to be appreciated that expressions can be added to each element to programmatically prune the path.

Figure 15:
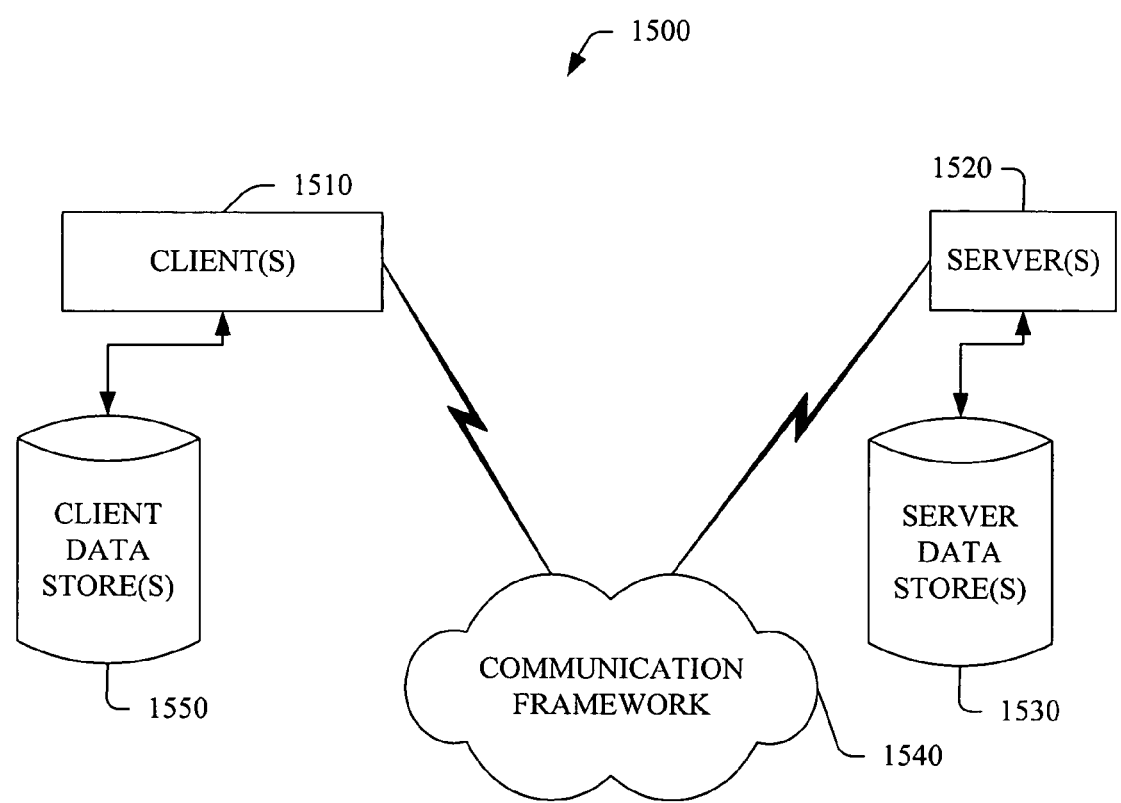
FIG. 15 illustrates an exemplary networking environment, wherein the novel aspects of the subject invention can be employed.
Figure 16:
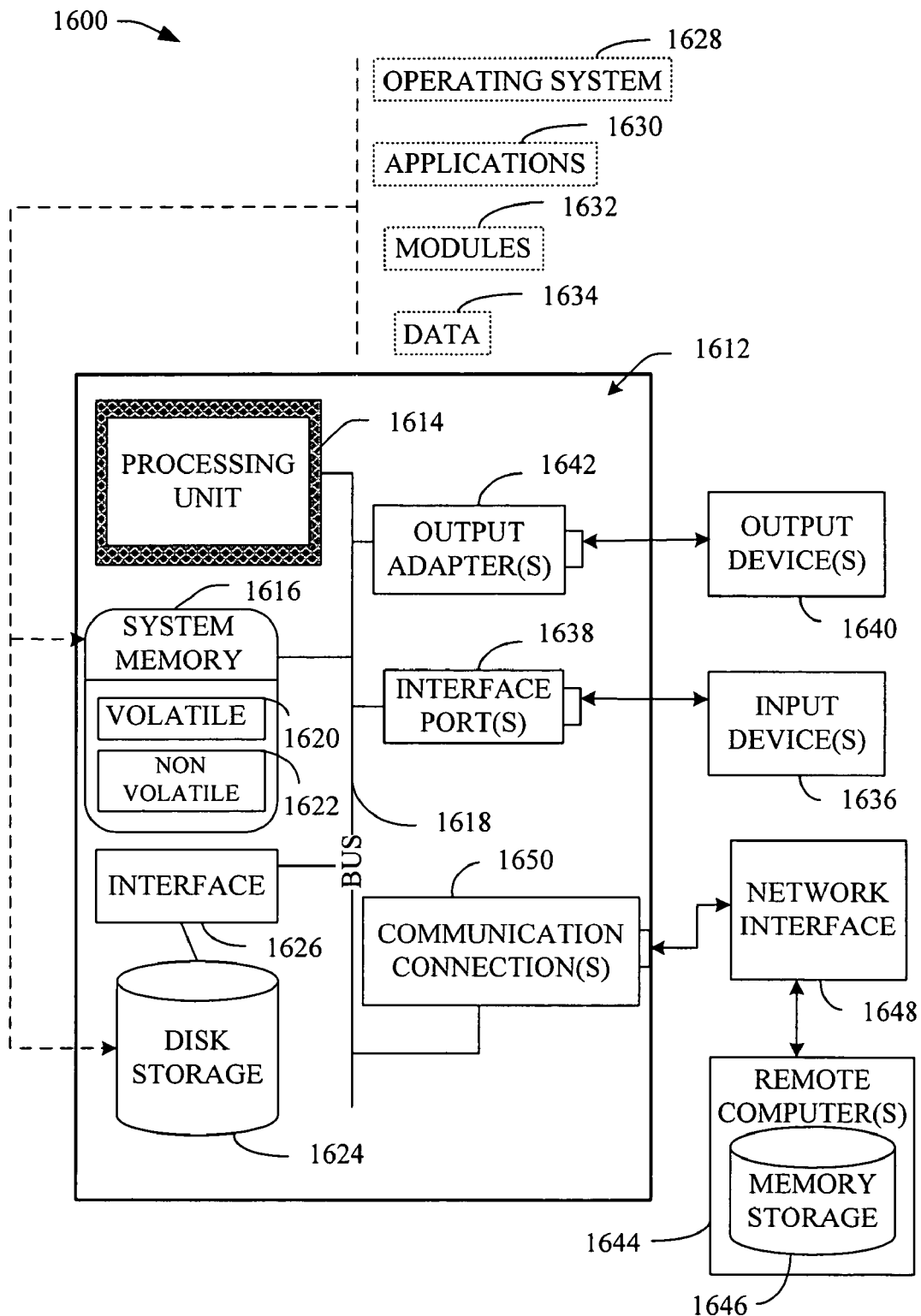
FIG. 16 illustrates an exemplary operating environment, wherein the novel aspects of the subject invention can be employed.

In order to provide additional context for implementing various aspects of the subject invention, FIGS. 15-16 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1520. The server(s) 1520 can be hardware and/or software (e.g., threads, processes, computing devices). The servers 1520 can house threads to perform transformations by employing the subject invention, for example.

One possible communication between a client 1510 and a server 1520 can be in the form of a data packet adapted to be transmitted between two or more computer processes. The system 1500 includes a communication framework 1540 that can be employed to facilitate communications between the client(s) 1510 and the server(s) 1520. The client(s) 1510 are operably connected to one or more client data store(s) 1550 that can be employed to store information local to the client(s) 1510. Similarly, the server(s) 1520 are operably connected to one or more server data store(s) 1530 that can be employed to store information local to the servers 1540.

With reference to FIG. 16, an exemplary environment 1600 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in the suitable operating environment 1600. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that facilitates developing an application, comprising:
a processor coupled to memory that retains:
a prescribing component that provides a prescribed navigation at design time to facilitate development of applications in hypermedia systems, the prescribed navigation comprises a topology and at least one navigation path, the prescribing component comprising:
a topology component that creates a topology during design time that includes a network of node objects and link objects based on received metadata related to a business framework such that node objects are interconnected with link objects, the node objects represent data instances and link objects represent traversable relationships between data instances; and
a navigation component that creates a navigation path during design time that includes a root node object associated with a sequential list of link objects included in the topology, the link objects linking to other nodes of the topology, wherein the navigation path is persisted as a set of metadata describing a navigation route, wherein the set of metadata is utilized to generate code including a navigation expression composed in a strong typed manner;
a navigation path service that contains the generated topology and navigation path as well as a navigation path provider that provides context to the nodes of the navigation path; and
an application that communicates with the navigation path service during runtime to display a sequence of user interfaces that correspond to the navigation path, wherein the application provides a navigation expression that identifies the navigation path by filtering nodes of the topology, wherein the navigation expression is an object model created during the design time of the application based on the topology and associated code such that the navigation path service instantiates the navigation path by binding a context to the starting node and returning a user interface for the starting node to the application, the user interface including at least one user interface object representing a link object that links the starting node to another node of the topology such that when the at least one user interface object is selected within the user interface, a second user interface is generated and returned to the application, the second user interface representing the other node, the other node being bound to a context provided by the navigation path service,
wherein a journal is maintained of the sequence of nodes for which a user interface is returned to the application, the prescribing component using the journal to generate a new navigation path that corresponds with the sequence of nodes traversed by the application and
wherein a filter that creates the navigation path by filtering the node in the topology with a navigation path expression.

2. The computer-implemented system of claim 1, wherein the topology and the navigation path are created during design time of the application using metadata.

3. The computer-implemented system of claim 1, the node object further represents a state of navigation containing a list of links to another node and associated data contents.

4. The computer-implemented system of claim 1, the node object is at least one of the following: an entity; an entity cube; a query; a task, and information source that is query-able from a provider.

5. The computer-implemented system of claim 1, the link object provides at least one of a reference to a source and a destination node or a request to a provider that offers access to a destination node.

6. The computer-implemented system of claim 1, further comprising a model editor that creates the navigation path from the topology by identifying a root node and pruning the sub-graph.

7. The computer-implemented system of claim 1, further comprising a user interface tool that provides for manual generation of the topology.

8. The computer-implemented system of claim 1, further comprising an automatic component that automatically creates the topology by utilizing at least one of: an entity graph, a business intelligence metadata, and a business intelligence journal.

9. The computer-implemented system of claim 1, further comprising a navigation path provider infrastructure that manages communication between a client application and at least one navigation path provider and enables the generation of the topology metadata in design time.

10. The computer-implemented system of claim 9, the navigation path provider infrastructure includes a navigation path provider that provides a navigation path service and accesses a context node through a transformation and/or an information retrieval mechanism.

11. The computer-implemented system of claim 10, the information retrieval mechanism is at least one of the following: a meta-model provider for the entity; a drill function for the business intelligence; a task for operation, and information that is query-able from a navigation path provider.

12. The computer-implemented system of claim 1, further comprising one of the following: a journal that records a history of navigation; and a user interface binding that enables a binding to a user interface driven by metadata.

13. A computer-implemented method that facilitates prescribing a navigation within an application, comprising:
   generating, by a processor, a prescribed navigation comprising a topology and navigation path at design time, wherein generating the prescribed navigation comprises:
      receiving metadata related to a business framework during design time;
      creating a topology during design time based upon the metadata, the topology including a network of node objects and link objects based on the received such that node objects are interconnected with link objects, the node objects representing data instances and link objects represent traversable relationships between data instances; and
      establishing a navigation path during design time as a sub-graph of the topology, the navigation path including a root node object associated with a sequential list of link objects that are included in the topology, wherein the navigation path is persisted as a set of metadata describing a navigation route, wherein the set of metadata is utilized to generate code including a navigation expression composed in a strong typed manner;
   receiving, by the processor, at a navigation path service, a request from an application at runtime to display a sequence of user interfaces that correspond to the navigation path, wherein the application provides a navigation expression that identifies the navigation path by filtering nodes of the topology, wherein the navigation expression is an object model created during the design time of the application based on the topology and associated code;
   instantiating, by the processor, the navigation path by binding a context to the starting node and returning a user interface for the starting node to the application, the user interface including at least one user interface object representing a link object that links the starting node to another node of the topology;
   receiving, by the processor, a request from the application that indicates selection of the at least one user interface object;
   generating and returning, by the processor, a second user interface to the application, the second user interface representing the other node, the other node being bound to a context provided by the navigation path service; and
   storing, by the processor, in a journal the sequence of nodes for which a user interface is returned to the application and using the journal to generate a new navigation path that corresponds with the sequence of nodes traversed by the application.

14. The method of claim 13, wherein the topology is a network of a node object and a link object representing a subset of traversable objects and paths and the navigation path is a sequential list of links over the topology.

* * * * *